United States Patent
Li et al.

(10) Patent No.: US 11,196,528 B2
(45) Date of Patent: Dec. 7, 2021

(54) METHOD AND DEVICE OF CHANNEL ESTIMATION BASED ON PRECODING GRANULARITY OF CONTROL RESOURCE SET

(71) Applicant: VIVO MOBILE COMMUNICATION CO., LTD., Chang'an Dongguan (CN)

(72) Inventors: Na Li, Chang'an Dongguan (CN); Xueming Pan, Chang'an Dongguan (CN); Xiaodong Shen, Chang'an Dongguan (CN); Yu Ding, Chang'an Dongguan (CN)

(73) Assignee: VIVO MOBILE COMMUNICATION CO., LTD.

( * ) Notice: Subject to any disclaimer, the term of this patent is extended or adjusted under 35 U.S.C. 154(b) by 0 days.

(21) Appl. No.: 16/652,162

(22) PCT Filed: Sep. 18, 2018

(86) PCT No.: PCT/CN2018/106277
§ 371 (c)(1),
(2) Date: Mar. 30, 2020

(87) PCT Pub. No.: WO2019/062604
PCT Pub. Date: Apr. 4, 2019

(65) Prior Publication Data
US 2020/0252189 A1 Aug. 6, 2020

(30) Foreign Application Priority Data
Oct. 1, 2017 (CN) .......................... 201710924707.5

(51) Int. Cl.
*H04L 5/00* (2006.01)
*H04B 7/0456* (2017.01)
*H04B 7/06* (2006.01)

(52) U.S. Cl.
CPC ......... *H04L 5/0091* (2013.01); *H04B 7/0456* (2013.01); *H04B 7/066* (2013.01)

(58) Field of Classification Search
CPC .......................... H04B 7/0456; H04L 25/0202
See application file for complete search history.

(56) References Cited

U.S. PATENT DOCUMENTS

| 2012/0140851 | A1 | 6/2012 | Zhang et al. | |
| 2020/0389879 | A1* | 12/2020 | Zhang | H04L 5/0028 |
| 2021/0083735 | A1* | 3/2021 | Sundararajan | H04L 5/0026 |

FOREIGN PATENT DOCUMENTS

| EP | 2469729 A1 | 6/2012 |
| WO | WO 2011020235 A1 | 2/2011 |
| WO | WO 2016/164099 A1 | 10/2016 |

OTHER PUBLICATIONS

International Search Report & Written Opinion related to Application No. PCT/CN2018/106277; reported on Dec. 20, 2018.
(Continued)

*Primary Examiner* — Kevin Kim
(74) *Attorney, Agent, or Firm* — von Briesen & Roper, s.c.

(57) ABSTRACT

The present application discloses a method of channel estimation based on precoding granularity of control resource set, which is applied to a user equipment with control resource set (CORESET) configured in a non-RRC manner. The method includes: determining precoding granularity according to a determination mode among a plurality of determination modes; performing channel estimation according to the precoding granularity. The plurality of determination modes includes: determining the precoding granularity according to a resource element group (REG) bindle size in frequency domain, determining the precoding granularity according to the number of consecutive resource blocks (RBs) in frequency domain of the CORESET, and (Continued)

S101 determining precoding granularity according to a determination mode among a plurality of determination modes

S103 performing channel estimation according to the precoding granularity determining the precoding granularity according to network configuration information. According to the present application, the precoding granularity of the control resource set configured in a non-RRC manner can be determined, so that the user equipment can determine the precoding granularity before the RRC connection is established, and then perform channel estimation.

10 Claims, 3 Drawing Sheets

(56) References Cited

OTHER PUBLICATIONS

OPPO; "On NR PDCCH structure design", 3GPP TSG RAN WG1 Meeting #90bis, R1-1718042, Prague, CZ, Oct. 9, 2017-Oct. 13, 2017.
Nokia et al.; "Remaining details of PDCCH construction", 3GPP TSG RAN WG1 Meeting NR#3, R1-1715748, Nagoya, Japan, Sep. 18, 2017-Sep. 21, 2017.
Nokia et al.; "Evaluation of intereaved CCE-to-REG mapping schemes for DL control channel", 3GPP TSG RAN WG1#89, R1-1708499, Hangzhou, P.R. China, May 15, 2017-May 19, 2017.
Extended European Search Report for related Application No. 18863118.8; reported on Nov. 6, 2020.
Hisilicon Huawei, "On NR-PDCCH structure", Sep. 18-21, 2017, 3GPP TSG RAN WG1 Meeting AH_NR #3, Nagoya, Japan.

\* cited by examiner

METHOD AND DEVICE OF CHANNEL ESTIMATION BASED ON PRECODING GRANULARITY OF CONTROL RESOURCE SET

CROSS-REFERENCE TO RELATED APPLICATION

This patent application is a 35 USC § 371 U.S. national stage of International Application No. PCT/CN2018/106277 filed on Sep. 18, 2018, which claims priority to Chinese Patent Application No. 201710924707.5 filed on Oct. 1, 2017, the disclosures of which are incorporated in their entirety by reference herein.

TECHNICAL FIELD

The present application relates to the field of communication technologies, and in particular to a method and device of channel estimation based on precoding granularity of control resource set.

BACKGROUND

In the future wireless communication system (for example, 5G NR), a physical downlink control channel (PDCCH) adopts a frequency-domain precoder cycling based transmission diversity scheme.

For control resource set (CORESET) configured for radio resource control (RRC), precoding granularity may be configured by RRC. However, CORESET which is not configured by RRC, such as remaining minimum system information CORESET (RMSI CORESET, i.e., CORESET of PDCCH that schedules Physical Downlink Shared Channel (PDSCH) for transmitting RMSI), is transmitted before RRC connection. In other words, when RMSI CORESET is transmitted, a user equipment (UE) has not received an RRC message transmitted by a network device.

Therefore, in order to ensure that the user equipment can correctly receive and demodulate information transmitted by the network device, a method for determining precoding granularity of control resource set configured in non-RRC mode is urgently needed, so that the user equipment can determine precoding granularity for channel estimation before an RRC connection is established.

SUMMARY

Embodiments of the present disclosure provide a method and device of channel estimation based on precoding granularity of control resource set, which can determine the precoding granularity of the control resource set configured in a non-RRC manner, so that the user equipment can determine the precoding granularity before the RRC connection is established, and then perform channel estimation.

Embodiments of the present disclosure adopt the following technical solutions.

According to a first aspect, a method of channel estimation based on precoding granularity of control resource set is provided, and is applied to a user equipment with control resource set (CORESET) configured in a non-RRC manner, including:

determining precoding granularity according to a determination mode among a plurality of determination modes;

performing channel estimation according to the precoding granularity;

wherein the plurality of determination modes comprise: determining the precoding granularity according to a resource element group (REG) bindle size in frequency domain, determining the precoding granularity according to the number of consecutive resource blocks (RBs) in frequency domain of the CORESET, and determining the precoding granularity according to network configuration information.

According to a second aspect, a method of channel estimation based on precoding granularity of control resource set is provided, and is applied to a network device with control resource set (CORESET) configured in a non-RRC manner, including:

determining network configuration information; wherein the network configuration information is used to indicate a user equipment (UE) to determine precoding granularity according to a resource element group (REG) bindle size in frequency domain, or the network configuration information is used to indicate the UE to determine the precoding granularity according to the number of consecutive resource blocks (RBs) in frequency domain of the CORESET, so that the UE determines the precoding granularity and then performs channel estimation.

According to a third aspect, a device of channel estimation based on precoding granularity of control resource set is provided, and is applied to a user equipment with control resource set (CORESET) configured in a non-RRC manner, including:

a precoding granularity determining module used to determine precoding granularity according to a determination mode among a plurality of determination modes;

a channel estimation module used to perform channel estimation according to the precoding granularity;

wherein the plurality of determination modes comprise: determining the precoding granularity according to a resource element group (REG) bindle size in frequency domain, determining the precoding granularity according to the number of consecutive resource blocks (RBs) in frequency domain of the CORESET, and determining the precoding granularity according to network configuration information.

According to a fourth aspect, a device of channel estimation based on precoding granularity of control resource set is provided, and is applied to a network device with control resource set (CORESET) configured in a non-RRC manner, including:

an information determining module used to determine network configuration information; wherein the network configuration information is used to indicate a user equipment (UE) to determine precoding granularity according to a resource element group (REG) bindle size in frequency domain, or the network configuration information is used to indicate the UE to determine the precoding granularity according to the number of consecutive resource blocks (RBs) in frequency domain of the CORESET, so that the UE determines the precoding granularity and then performs channel estimation.

According to a fifth aspect, a user equipment is provided and includes: a memory, a processor, and a computer program stored on the memory and operable on the processor; wherein the computer program is executed by the processor to implement steps of the method according to the first aspect.

According to a sixth aspect, a network device is provided and includes: a memory, a processor, and a computer program stored on the memory and operable on the processor;

wherein the computer program is executed by the processor to implement steps of the method according to the second aspect.

According to a seventh aspect, a computer readable storage medium including a computer program stored thereon; wherein the computer program is executed by a processor to implement steps of the method according to the first aspect.

According to an eighth aspect, a computer readable storage medium including a computer program stored thereon; wherein the computer program is executed by a processor to implement steps of the method according to the second aspect.

According to the embodiments of the present application, for control resource set (CORESET) configured in a non-RRC manner, the precoding granularity of the control resource set (CORESET) is determined according to the determination mode which is determined from a plurality of methods for determining precoding granularity. Then, the user equipment can determine the precoding granularity before the RRC connection is established, and then perform channel estimation.

BRIEF DESCRIPTION OF THE DRAWINGS

The drawings described herein are intended to provide a further understanding of the present application and constitute a part of the present application. The exemplary embodiments of the present application and their descriptions are used to explain the present application and do not constitute an improper limitation on the present application. In the drawings.

DETAILED DESCRIPTION

In order to enable those skilled in the art to better understand the technical solutions in the present application, the technical solutions in the embodiments of the present application will be clearly and completely described hereinafter with reference to the accompanying drawings in the embodiments of the present application. Obviously, the following embodiments are merely a part of, rather than all of, the embodiments of the present application, and based on these embodiments of the present application, a person skilled in the art may obtain the other embodiments, which also fall within the scope of the present application. The terms "and/or" in the claims and the description mean at least one of connected objects.

It should be understood that the technical solution of the embodiment of the present application can be applied to a 5G system, which is also referred as New Radio (NR) system.

In the embodiment of the present application, a terminal device may include, but is not limited to, Mobile Station (MS), Mobile Terminal, Mobile Telephone, User Equipment (UE), handset, portable equipment and vehicle. The terminal device may communicate with one or more core networks via a Radio Access Network (RAN). For example, the terminal device may be a mobile phone (or referred as "cellular" telephone), a computer with wireless communication capabilities, etc. The terminal device may also be portable, pocket-sized, handheld, computer-integrated or in-vehicle mobile devices.

The network device involved in the embodiment of the present application is a device deployed in a radio access network to provide a wireless communication function for the terminal device. The network device may be a base station, and the base station may include various forms of macro base stations, micro base stations, relay stations, access points. In systems with different radio access technologies, names of devices with functions of the base station may be varied. For example, in the LTE network, it is called an evolved Node B (eNB or eNodeB), and in the 3rd generation (3G) network, it is called a Node B.

The embodiment of the present application provides a scheme for determining precoding granularity for a control resource set (CORESET) configured in a non-RRC mode. One typical non-RRC mode includes: Remaining minimum system information (RMSI). The precoder cycling is a transmission diversity scheme of NR PDCCH. The precoder cycling is that, with a certain granularity, the same precoding mode is adopted in each granularity, and different granularities adopt different precoding modes. In other words, the precoding mode is cyclically changed in a certain manner in the frequency domain, so that a certain coding gain can be obtained. The terminal device needs to know the granularity of PDCCH precoder, because a receiving end needs to known which PRBs use the same precoding mode and which PRBs use different precoding modes when the receiving end performs channel estimation.

Figure 1:
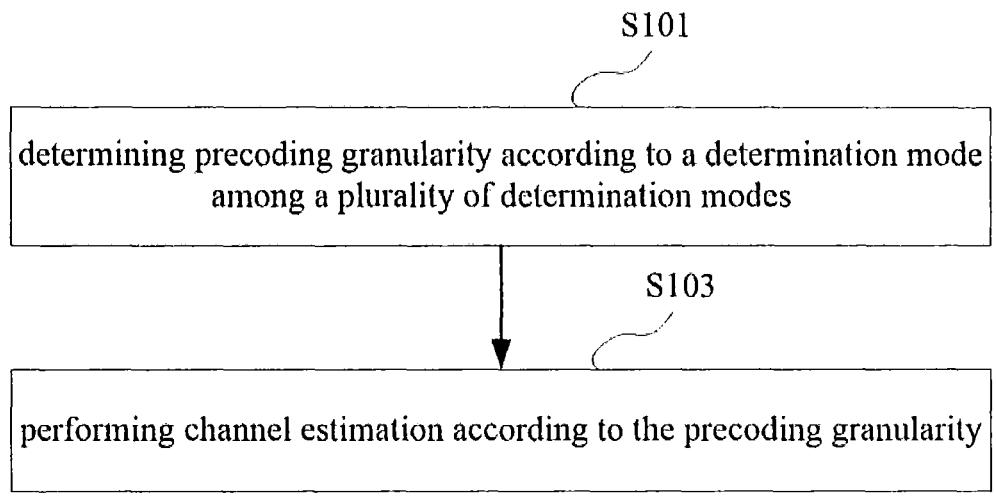
FIG. 1 is a first schematic flowchart of a method of channel estimation according to an embodiment of the present application.

One embodiment of the present application provides a method of channel estimation based on precoding granularity of control resource set, which is applied to a terminal device with the control resource set configured in a non-RRC manner. Referring to FIG. 1, the method includes:

S101: determining precoding granularity according to a determination mode among a plurality of determination modes;

S103: performing channel estimation according to the precoding granularity.

The plurality of determination modes include: determining the precoding granularity according to a resource element group bindle size in frequency domain, determining the precoding granularity according to the number of consecutive resource blocks (RBs) in frequency domain of the CORESET, and determining the precoding granularity according to network configuration information.

In the embodiment of the present application, for the control resource set configured in non-RRC mode, the precoding granularity of the control resource set (CORESET) is determined according to the determination mode which is determined from a plurality of methods for determining precoding granularity. Then, the terminal device can determine the precoding granularity before the RRC connection is established, and then perform channel estimation.

In an optional embodiment, the determination mode is to determine the precoding granularity according to resource element group (REG) bundle size in frequency domain.

Figure 2:
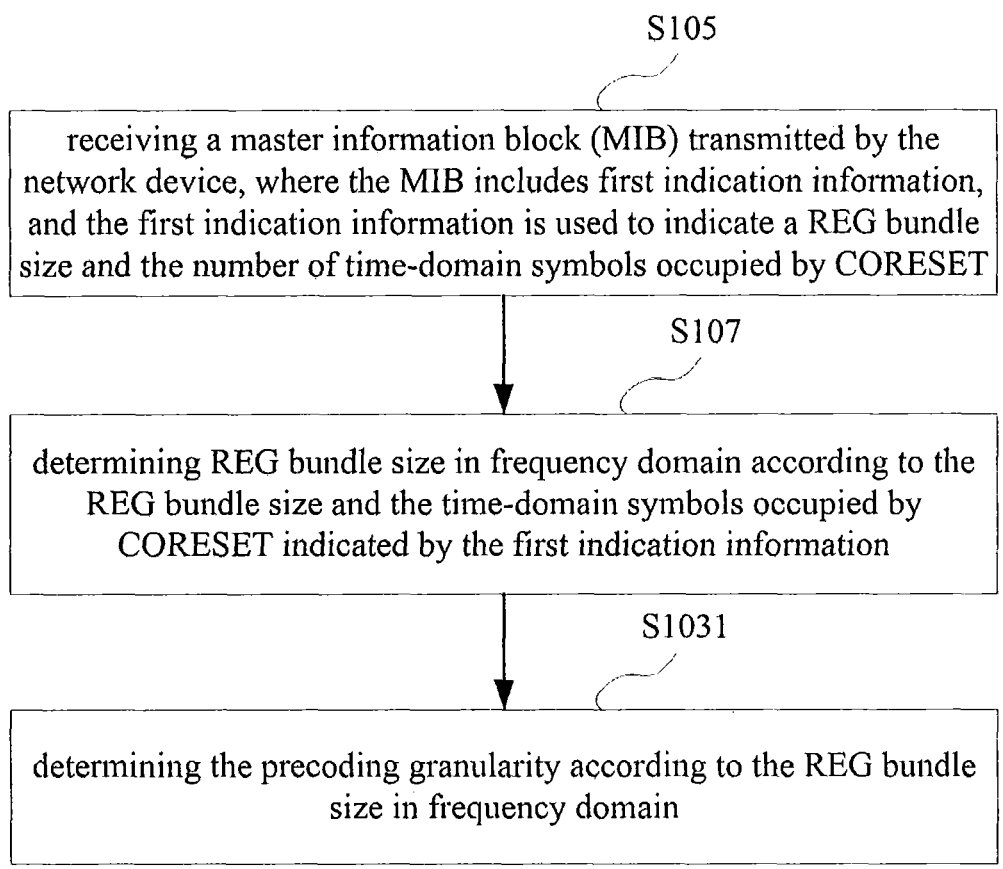
FIG. 2 is a second schematic flowchart of a method of channel estimation according to an embodiment of the present application.

Further, as shown in FIG. 2, in order to implement the foregoing determination mode so that the terminal device can determine the precoding granularity according to the REG bundle size in frequency domain, the method in the embodiment of the present application further includes:

S105: receiving a master information block (MIB) transmitted by the network device, where the MIB includes first indication information, and the first indication information is used to indicate a REG bundle size and the number of time-domain symbols occupied by CORESET;

S107: determining REG bundle size in frequency domain according to the REG bundle size and the time-domain symbols occupied by CORESET indicated by the first indication information.

After that, step S1031 of determining the precoding granularity according to the REG bundle size in frequency domain, can be performed.

In a specific implementation, the indication information is transmitted to user equipment (UE) through the MIB to indicate the REG bundle size and CORESET duration (which can be represented by the time-domain symbols occupied by CORESET). According to the REG bundle size and the CORESET duration, the UE can obtain the REG bundle size in frequency domain via a specific calculation manner of division between the two, i.e., REG bundle size/CORESET duration, for example, 6/2=3 (the REG bundle size in frequency domain obtained via calculation is 3).

In addition, in order to implement the foregoing determination mode so that the terminal device can determine the precoding granularity according to the REG bundle size in frequency domain, the method in the embodiment of the present application may also include:

determining the REG bundle size in frequency domain according to REG bundle size predetermined in the protocol.

Figure 3:
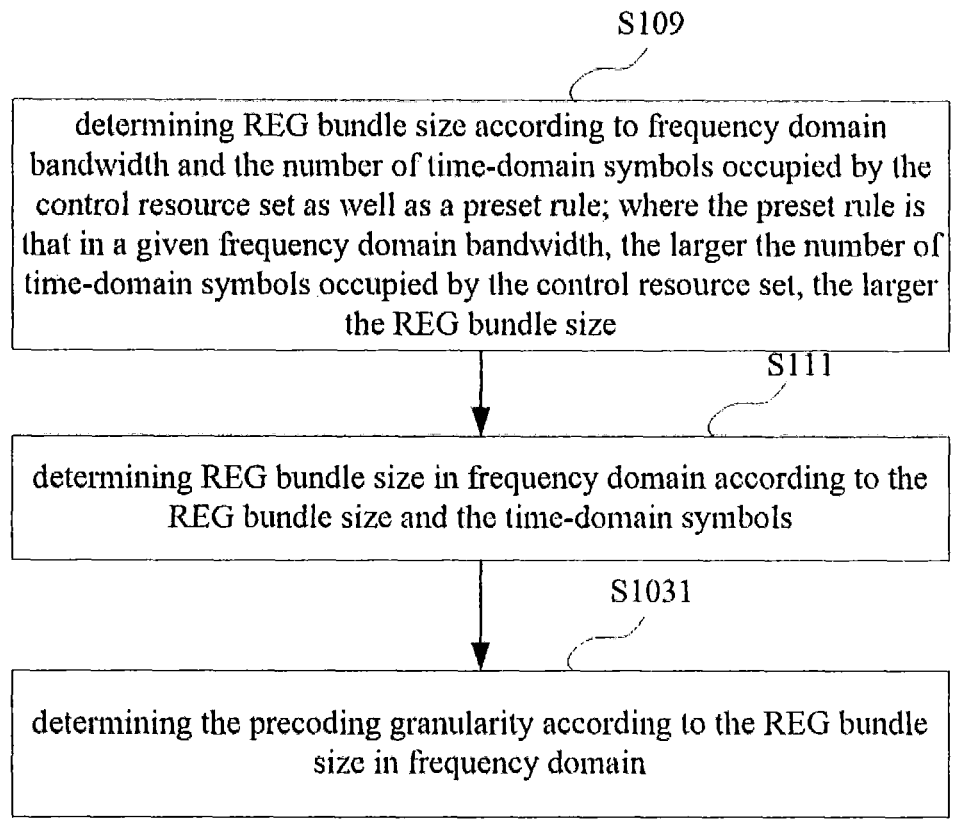
FIG. 3 is a third schematic flowchart of a method of channel estimation according to an embodiment of the present application.

In addition, as shown in FIG. 3, in order to implement the foregoing determination mode so that the terminal device can determine the precoding granularity according to the REG bundle size in frequency domain, the method in the embodiment of the present application may also include:

S109: determining REG bundle size according to frequency domain bandwidth and the number of time-domain symbols occupied by the control resource set as well as a predetermined rule; where the predetermined rule is that in a given frequency domain bandwidth, the larger the number of time-domain symbols occupied by the control resource set, the larger the REG bundle size;

S111: determining REG bundle size in frequency domain according to the REG bundle size and the time-domain symbols.

After that, the step S1031 of determining the precoding granularity according to the REG bundle size in frequency domain, can be performed.

The procedure for determining REG bundle size in frequency domain will be described hereinafter in details with examples.

For example, for RMSI CORESET with a given number of time-domain symbols, when the frequency domain bandwidth is larger, a larger bundle size (for example, 6 REGs) is used; otherwise, when the frequency domain bandwidth is smaller, a smaller bundle size (for example, 2 REGs) is used.

When judging whether the frequency domain bandwidth of the RMSI CORESET is "larger" or "smaller", for CORSERT of different symbol lengths, judgment thresholds may be different. This is because: for CORSERT of different symbol lengths, they have the same REG bundle size (the concept of REG bundle size is defined in time-frequency domain, thus the REG bundle size in the embodiment of the present application refers to the REG bundle size in the time-frequency domain, unless otherwise specified as the REG bundle size in frequency domain), but have different REG bundle size in frequency domain. For example, for CORESET with a length of one symbol, REG bundle size=6, the REG bundle size in frequency domain is also 6; for CORESET with a length of 3 symbols, REG bundle size=6, the REG bundle size in frequency domain is only equal to 6/3=2. Thus, in the case of the same frequency domain bandwidth, the larger the number of time domain symbols, the larger the bundle size of CORESET.

For another example, for CORESET with a length of one symbol, the aggregation level AL=4 (24 REGs), it can be considered that the frequency domain bandwidth is larger; for CORESET with a length of 2 symbols, AL=8 (48 REGs), it can be considered that the frequency domain bandwidth is larger; for CORESET with a length of 3 symbols, AL=16 (96 REGs), it can be considered that the frequency domain bandwidth is larger.

In the NR standardization, in actual implementation, for CORESET configured by RRC, only CORESET duration=1/2/3 OFDM symbol (number of OFDM symbol) is supported; for CORESET of multiple symbols, bundle size may be equal to the time domain symbol length or 6 (6 is a multiple of 2 and 3). For RMSI CORESET in the initial access procedure, it is likely to break this limitation, by supporting CORESET with a length of 4 symbols, bundle size=6 which is not an integer multiple of 4, or only supporting bundle size=4 or configurable between 4 and 8.

In the above described embodiments, after the REG bundle size in frequency domain is determined according to the various preferred embodiments, when performing the step S1031, the REG bundle size in frequency domain may be directly determined as the precoding granularity, thereby achieving the technical purpose of the present application.

In another optional embodiment, the determination mode is to determine the precoding granularity according to the number of consecutive resource blocks (RBs) in frequency domain of the CORESET.

Further, the number of consecutive resource blocks (RBs) in frequency domain of the CORESET may be directly determined as the precoding granularity.

In another optional embodiment, the determination mode is to determine the precoding granularity according to network configuration information, then the method further includes:

receiving a master information block (MIB) transmitted by the network device, where the MIB includes network configuration information, and the network configuration information is used to indicate determining the precoding granularity according to the REG bundle size in frequency domain, or the network configuration information is used to indicate determining the precoding granularity according to the number of consecutive resource blocks (RBs) in frequency domain of the CORESET.

In this optional embodiment, the network device is allowed to add the network configuration information for indicating the determination mode to the MIB. After the UE receives the indication information, the UE determines the determination mode according to the configuration in the MIB. More specifically, the determination mode may be selected from the above exemplary determination modes.

One embodiment of the present application further provides a method of channel estimation based on precoding granularity of control resource set, which is applied to a network device, the method includes:

determining network configuration information, where the network configuration information is used to indicate a user equipment (UE) to determine precoding granularity according to REG bundle size in frequency domain, or the network configuration information is used to indicate the UE to determine the precoding granularity according to the number of consecutive resource blocks (RBs) in frequency domain of the CORESET, so that the UE determines the precoding granularity and then performs channel estimation.

Optionally, the method further includes: transmitting a master information block (MIB) to the UE, where the MIB includes the network configuration information.

Optionally, when the network configuration information is used to indicate the UE to determine precoding granularity according to REG bundle size in frequency domain, the MIB further includes first indication information, and the first indication information is used to indicate a REG bundle size and the number of time-domain symbols occupied by CORESET.

Figure 4:
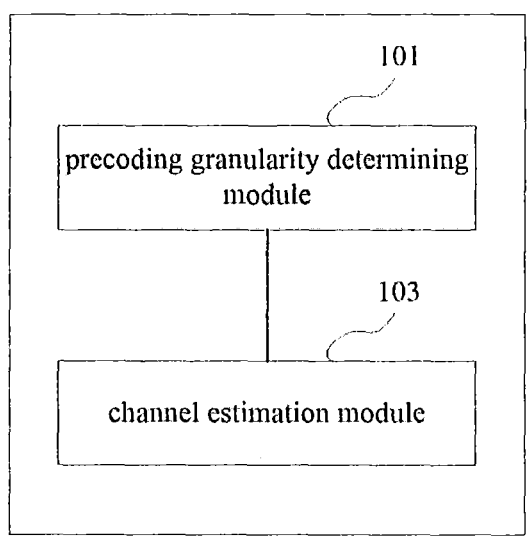
FIG. 4 is a schematic diagram of a channel estimation device according to an embodiment of the present application.

As shown in FIG. 4, one embodiment of the present application further provides a device of channel estimation based on precoding granularity of control resource set, which is applied to a terminal device with the control resource set configured in a non-RRC manner. The device includes:

a precoding granularity determining module 101 used to determine precoding granularity according to a determination mode among a plurality of determination modes;

a channel estimation module 103 used to perform channel estimation according to the precoding granularity;

where the plurality of determination modes include: determining the precoding granularity according to a resource element group bundle size in frequency domain, determining the precoding granularity according to the number of consecutive resource blocks (RBs) in frequency domain of the CORESET, and determining the precoding granularity according to network configuration information.

Optionally, in the foregoing device, when one determination mode is to determine the precoding granularity according to resource element group (REG) bundle size in frequency domain, the above device includes:

a first MIB receiving module used to receive a master information block (MIB) transmitted by the network device, where the MIB includes first indication information, and the first indication information is used to indicate a REG bundle size and the number of time-domain symbols occupied by CORESET;

a REG-bundle-size-in-frequency-domain first determining module used to determine REG bundle size in frequency domain according to the REG bundle size and the time-domain symbols occupied by CORESET indicated by the first indication information.

Optionally, when one determination mode is to determine the precoding granularity according to resource element group (REG) bundle size in frequency domain, the above device includes:

a REG-bundle-size-in-frequency-domain second determining module used to determine the REG bundle size in frequency domain according to REG bundle size predetermined in the protocol.

Optionally, when one determination mode is to determine the precoding granularity according to resource element group (REG) bundle size in frequency domain, the above device includes:

a REG-bundle-size determining module used to determine REG bundle size according to frequency domain bandwidth and the number of time-domain symbols occupied by the control resource set as well as a predetermined rule; where the predetermined rule is that in a given frequency domain bandwidth, the larger the number of time-domain symbols occupied by the control resource set, the larger the REG bundle size;

a REG-bundle-size-in-frequency-domain third determining module used to determine REG bundle size in frequency domain according to the REG bundle size and the time-domain symbols.

Optionally, determining the precoding granularity according to the REG bundle size in frequency domain may include:

determining REG bundle size in frequency domain as the precoding granularity.

Optionally, when one determination mode is to determine the precoding granularity according to the number of consecutive resource blocks (RBs) in frequency domain of the CORESET, the number of consecutive resource blocks (RBs) in frequency domain of the CORESET may be specifically determined as the precoding granularity.

Optionally, when one determination mode is to determine the precoding granularity according to the network configuration information, the above device further includes:

a second MIB receiving module used to receive a master information block (MIB) transmitted by the network device, where the MIB includes network configuration information, and the network configuration information is used to indicate determining the precoding granularity according to the REG bundle size in frequency domain, or the network configuration information is used to indicate determining the precoding granularity according to the number of consecutive resource blocks (RBs) in frequency domain of the CORESET.

The device of channel estimation based on precoding granularity of control resource set provided in the foregoing embodiment can implement the foregoing various procedures in the method of channel estimation based on precoding granularity of control resource set, and can achieve the same technical effect. To avoid repetition, details will not be repeated here.

Figure 7:
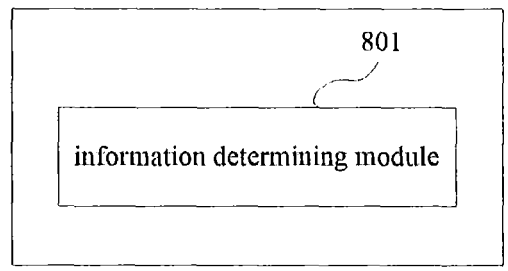
FIG. 7 is a schematic diagram of a channel estimation device according to another embodiment of the present application.

One embodiment of the present application further provides a device of channel estimation based on precoding granularity of control resource set, which is applied to a network device with the control resource set configured in a non-RRC manner. Referring to FIG. 7, the device includes:

an information determining module 801 used to determine network configuration information, where the network configuration information is used to indicate a user equipment (UE) to determine precoding granularity according to REG bundle size in frequency domain, or the network configuration information is used to indicate the UE to determine the precoding granularity according to the number of consecutive resource blocks (RBs) in frequency domain of the CORESET, so that the UE determines the precoding granularity and then performs channel estimation.

Optionally, the above device further includes:

an MIB transmission module used to transmit a master information block (MIB) to the UE, where the MIB includes the network configuration information.

Optionally, in the above device, when the network configuration information is used to indicate the UE to determine precoding granularity according to REG bundle size in frequency domain, the MIB further includes first indication information, and the first indication information is used to indicate a REG bundle size and the number of time-domain symbols occupied by CORESET.

One embodiment of the present application further provides a user equipment, including: a memory, a processor, and a computer program stored on the memory and operable on the processor. The computer program is executed by the processor to implement steps of the method of channel estimation based on precoding granularity of control resource set.

Figure 5:
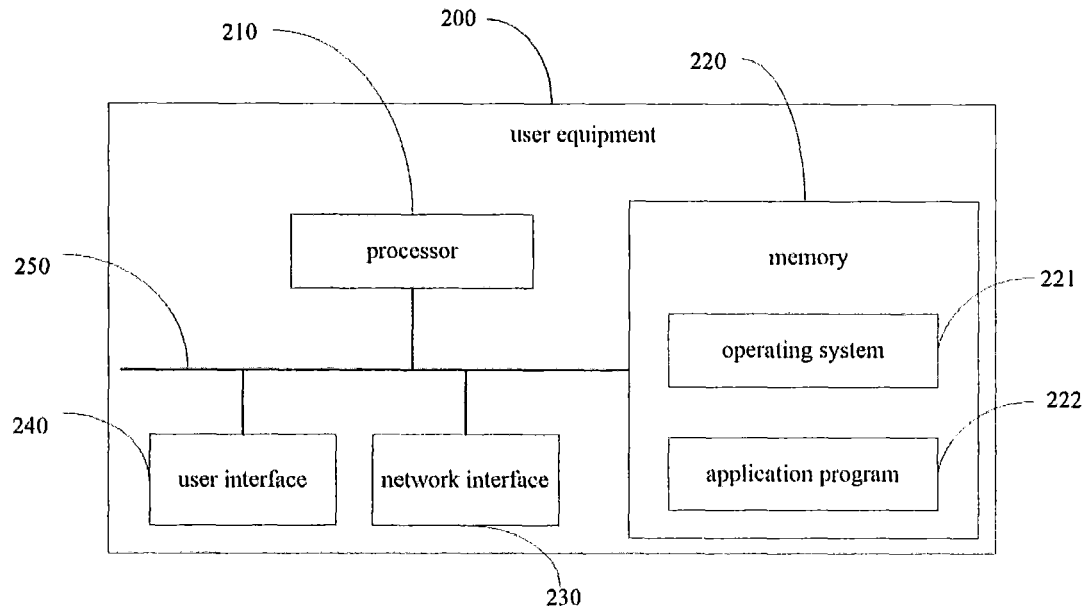
FIG. 5 is a schematic diagram of a terminal device according to an embodiment of the present application.

Specifically, FIG. 5 is a schematic diagram of a terminal device according to another embodiment of the present disclosure. As shown in FIG. 5, the terminal device 200 includes: at least one processor 210, a memory 220, at least one network interface 230 and a user interface. 240. The various components in the terminal device 200 are coupled together by a bus system 250. It will be appreciated that the bus system 250 is configured to implement the connection and communication among the components. The bus system 250 includes a power bus, control bus, state signal bus besides a data bus. For the clarity of description, each bus in the FIG. 5 is denoted as the bus system 250.

The user interface 240 may include a monitor, keyboard, or clickable device (for example, a mouse, track ball, touchpad, or touch screen).

It can be understood that the memory 220 in embodiments of the present disclosure may be a volatile storage or a nonvolatile storage, or both the volatile storage and nonvolatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. By way of example but not limitation, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DRRAM). The memory 220 in the system and method described in embodiments of the present disclosure include, but is not limited to, these and any other suitable types of storages.

In some embodiments, the memory 220 stores following elements, such as executable modules, data structure, subset thereof, or superset thereof: operating system 221 and an application program 222.

The operating system 221 includes various kinds of system programs, such as a framework layer, a core library layer and a driver layer, which are used to implement various kinds of basic services and process hardware-based tasks. The application program 222 includes various kinds of application programs, such as Media Player and Browser, which are used to implement various kinds of application services. Programs, which are used to implement the methods in embodiments of the present disclosure, may be included in the application program 222.

In one embodiment of the present disclosure, the terminal device 200 further includes a computer program stored on the memory 220 and executable on the processor 210. The computer program is executed by the processor 210 to implement various procedures of the foregoing methods with the same technical effect achieved. To avoid repetition, details will not be repeated here.

The methods in the above embodiments of the present disclosure may be applied to or implemented by the processor 210. The processor 210 may be an integrated circuit chip with signal processing capability. In the implementation process, each step of the above method can be completed by the integrated logic circuit of the hardware in processor 210 or the instructions in the form of software. The processor 210 mentioned above may be a general purpose processor, Digital Signal Processor (DSP), Application Specific Integrated Circuit (ASIC), Field Programmable Gate Array (FPGA) or other programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 220, and the processor 210 reads the information in the memory 220 to implement steps in the above method in combination with the hardware. Specifically, the computer readable storage medium stores a computer program-a program of channel estimation based on precoding granularity of control resource set; the computer program is executed by the processor 210 to implement steps of the method of channel estimation based on precoding granularity of control resource set.

The present application further provides a network device, including: a memory, a processor, and a computer program stored on the memory and operable on the processor. The computer program is a program of channel estimation based on precoding granularity of control resource set. The computer program is executed by the processor to implement steps of the method of channel estimation based on precoding granularity of control resource set.

Figure 6:
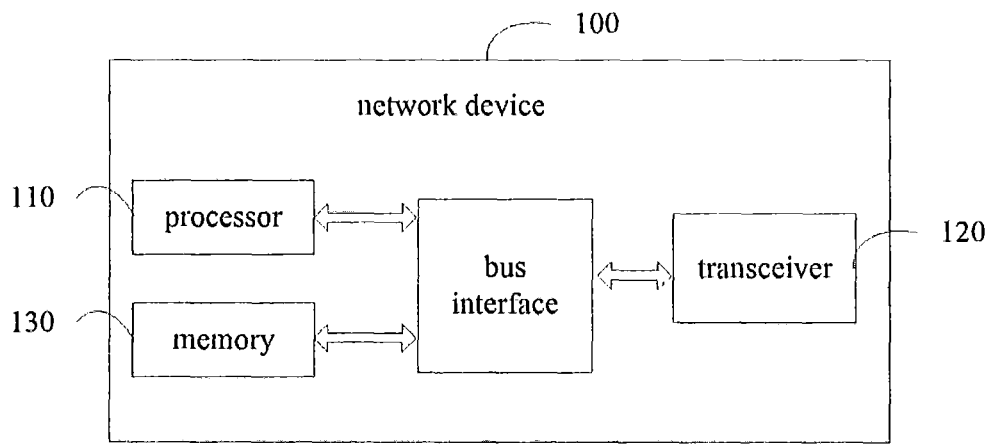
FIG. 6 is a schematic diagram of a network device according to an embodiment of the present application.

Specifically, FIG. 6 is a schematic diagram of a network device according to an embodiment of the present disclosure. As shown in FIG. 6, the network device 100 includes a processor 110, a transceiver 120, a memory 130 and a bus interface.

In one embodiment of the present disclosure, the network device 100 further includes: a computer program stored on the memory 130 and operable on the processor 110. The computer program is executed by the processor 110 to implement procedures of the above method with the same technical effect achieved. To avoid repetition, details will not be repeated here.

In FIG. 6, a bus architecture may include any number of interconnected buses and bridges. Specifically, various circuits of one or more processors, which are represented by the processor 110, and the storage, which is represented by the memory 130, are linked together. The bus architecture may link various other circuits, such as a peripheral device, voltage regulator and a power management circuit together. These features are well known in this field, therefore, this disclosure does not make further description on these features. The bus interface provides an interface. The transceiver 120 may be multiple elements, including a transmitter and a receiver, and provide units, which communicate with other devices on the transmission medium.

The processor 110 is responsible for managing the bus architecture and common processing and the memory 130 may store data used by the processor 110 when executing the operations.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

One embodiment of the present application further provides a computer readable storage medium. The computer readable storage medium stores a computer program. The computer program is executed by a processor to implement procedures of the above method with the same technical effect achieved. To avoid repetition, details will not be repeated here. The computer readable storage medium may be, for example, a read-only memory (ROM), a random access memory (RAM), a magnetic disk, or an optical disk.

One embodiment of the present application further provides a computer program product including instructions. When a computer runs the instructions of the computer program product, the computer implements the method of channel estimation of the above method embodiment. Specifically, the computer program product can run on the network device and the terminal device.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the predetermined disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure. Therefore, the protection scope of the present disclosure shall be subject to the protection scope of the claims.

What is claimed is:

1. A method of channel estimation based on precoding granularity of control resource set, which is applied to a user equipment with control resource set (CORESET) configured in a non-RRC manner, comprising:
   determining precoding granularity according to a resource element group (REG) bindle size in frequency domain;
   performing channel estimation according to the precoding granularity;
   wherein the method further comprises:
   determining, the REG bundle size in frequency domain according to REG bundle size predetermined in the protocol.

2. A method of channel estimation based on precoding granularity of control resource set, which is applied to a network device with control resource set (CORESET) configured in a non-RRC manner, comprising:
   determining network configuration information; wherein the network configuration information is used to indicate a user equipment (UE) to determine precoding granularity according to a resource element group (REG) bindle size in frequency domain, so that the UE determines the precoding granularity and then performs channel estimation;

the method further comprises:

indicating the UE to determine the REG bundle size in frequency domain according to REG bundle size redetermined in the protocol.

3. The method according to claim 2, wherein the method further comprises: transmitting a master information block (MIB) to the UE; wherein the MIB comprises the network configuration information.

4. The method according to claim 3, wherein the network configuration information is used to indicate the UE to determine the precoding granularity according to the REG bundle size in frequency domain.

5. A user equipment comprising: a memory, a processor, and a computer program stored on the memory and operable on the processor; wherein the computer program is executed by the processor to implement steps of a method of channel estimation based on precoding granularity of control resource set (CORESET) configured in a non-RRC manner, which comprises:

determining precoding granularity according to a resource element group (REG) bindle size in frequency domain;

performing channel estimation according to the precoding granularity;

wherein the computer program is executed by the processor to implement steps of determining the REG bundle size in frequency domain according REG bundle size predetermined in the protocol.

6. A network device comprising: a memory, a processor, and a computer program stored on the memory and operable on the processor; wherein the computer program is executed by the processor to implement steps of the method according to claim 2.

7. A non-transitory computer readable storage medium comprising a computer program stored thereon; wherein the computer program is executed by a processor to implement steps of the method according to claim 1.

8. A non-transitory computer readable storage medium comprising a computer program stored thereon; wherein the computer program is executed by a processor to implement steps of the method according to claim 2.

9. The method according to claim 1, wherein the determining the precoding granularity according to the REG bundle size in frequency domain comprises:

determining the REG bundle size in frequency domain as the precoding granularity.

10. The user equipment according to claim 5, wherein the computer program is executed by the processor to implement steps of determining the REG bundle size in frequency domain as the precoding granularity.

* * * * *